United States Patent
Lin et al.

(10) Patent No.: US 8,853,594 B2
(45) Date of Patent: Oct. 7, 2014

(54) WELDING METHOD AND APPARATUS THEREFOR

(75) Inventors: Dechao Lin, Greer, SC (US); Jamison William Janawitz, Overland Park, KS (US); David Vincent Bucci, Simpsonville, SC (US); Matthew James O'Connell, Taylor, SC (US); Srikanth Chandrudu Kottilingam, Simpsonville, SC (US); Ronald Lee Souther, Campobello, SC (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 13/543,938

(22) Filed: Jul. 9, 2012

(65) Prior Publication Data

US 2014/0008333 A1    Jan. 9, 2014

(51) Int. Cl.
  *B23K 9/02* (2006.01)
  *B23K 9/235* (2006.01)
  *B23K 26/14* (2014.01)
  *B23K 28/02* (2014.01)
  *B23K 9/00* (2006.01)

(52) U.S. Cl.
  CPC ... *B23K 9/00* (2013.01); *B23K 9/02* (2013.01); *B23K 26/1429* (2013.01); *B23K 26/14* (2013.01); *B23K 28/02* (2013.01); *B23K 26/1423* (2013.01); *B23K 9/235* (2013.01)
  USPC .................... 219/136; 219/137 R; 219/121.6; 219/121.63; 219/121.64; 219/121.85

(58) Field of Classification Search
  CPC ...... B23K 9/02; B23K 26/14; B23K 26/1423; B23K 26/1429; B23K 28/02; B23K 9/235
  USPC ............................................ 219/121.11–144
  See application file for complete search history.

(56) References Cited

U.S. PATENT DOCUMENTS

| 8,253,061 | B2 * | 8/2012 | Nowak et al. | 219/121.63 |
| 8,592,715 | B2 * | 11/2013 | Wang et al. | 219/121.64 |
| 2011/0089149 | A1 | 4/2011 | Watanabe | |
| 2013/0309000 | A1 * | 11/2013 | Lin et al. | 403/270 |

* cited by examiner

*Primary Examiner* — Samuel M Heinrich
(74) *Attorney, Agent, or Firm* — Ernest G. Cusick; Gary M. Hartman; Domenica N. S. Hartman

(57) ABSTRACT

Methods and apparatus for welding a component to fill a groove therein. The method entails simultaneously projecting an electric arc and at least first and second laser beams into the groove. The electric arc melts and deposits a filler material in the groove while the first and second laser beams are projected onto opposite first and second walls, respectively, of the groove. The axis of each of the first and second laser beams is oriented at an acute angle relative to the respective wall thereof.

20 Claims, 3 Drawing Sheets

WELDING METHOD AND APPARATUS THEREFOR

BACKGROUND OF THE INVENTION

The present invention generally relates to welding processes, equipment and materials. More particularly, this invention relates to a welding method and apparatus adapted for filling a groove in an article.

It is often economically beneficial to repair components that have suffered cracks rather than replace them. One such repair technique has been referred to as narrow groove welding. Typically, this technique may require preparation of the component prior to welding. For example, the component may be machined to remove the crack and the region immediately surrounding the cracked, with the result that the component is separated into two or more pieces. Thereafter, a weld buildup technique, for example, a cladding technique, may be used to apply material to the machined surfaces of the component to achieve flat surfaces that can be more readily welded.

Narrow groove welding has become an important technique in the manufacture and repair of thick-walled components, due in part to advantageous features such as high welding speed and weld quality. Methods for performing narrow groove welding have included gas tungsten arc welding (GTAW) techniques (also known as tungsten inert gas (TIG) welding), laser welding, plasma transferred arc (PTA) welding processes and hybrid laser arc welding (HLAW), which can be performed at room and elevated temperatures. For narrow groove welding, these welding techniques use a filler material, typically a ductile filler or a filler whose chemistry closely matches that of the base metal being welded.

The most frequent defect in narrow groove welding is incomplete fusion of the filler material into the walls of the narrow groove. In order to limit the effects of this defect, it is important to maintain uniform and sufficient penetration at both groove walls. Several different approaches have been adopted in attempts to minimize the incomplete wall fusion in narrow groove welding processes. For example, an arc weaving technique has been used wherein a side to side movement along the seam is performed. As a particular example, if a gas metal arc welding technique is used, the electrode may be oscillated by adopting a wire bending technique in which the bending direction is periodically changed. Alternatively, a wire rotating technique can be used that involves rotating an eccentric contact tip. These techniques are effective for penetration at both groove walls. However, wire bending techniques generally require complex systems, the number of oscillations is limited, and the wear resistance of the contact tip is often low. In the case of wire rotating techniques, the minimum root opening is often limited by the need to rotate the whole welding head, and the rotation of the eccentric contact tip may cause the welding head to vibrate, especially in deep groove welding of articles with relatively thick cross-sections.

Additional issues can arise if the component being welded is composed of a highly alloyed metal. Such alloys often have inherently poor weldability and therefore require longer welding operation times in order to achieve fusion with the weld walls. Further, many of these alloys must be preheated prior to welding. For example, CrMoV-base steels, such as those used for components of steam turbine engines, often require a preheat temperature of about 350° F. (about 175° C.) or more. These elevated temperatures may create an environment that is unsuitable for manual welding, in which case narrow groove welding is preferably performed by an automated welding system.

In view of the above, it can be appreciated that there are certain problems, shortcomings or disadvantages associated with prior art narrow groove welding techniques, and it would be desirable if an improved welding technique were developed that was capable of filling a groove in an article to yield a weldment with improved wall fusion.

BRIEF DESCRIPTION OF THE INVENTION

The present invention provides a method and apparatus suitable for filling a groove in an article, and capable of yielding a weldment characterized by improved wall fusion.

According to a first aspect of the invention, a method is provided that involves welding a component to fill a groove by simultaneously projecting an electric arc and at least first and second laser beams into the groove. The electric arc melts and deposits a filler material in the groove while the first and second laser beams are projected onto opposite first and second walls, respectively, of the groove. The axis of each of the first and second laser beams is oriented at an angle of sixty degrees or less relative to the respective wall thereof.

According to a second aspect of the invention, a method is provided that involves welding a component to fill grooves therein, by simultaneously projecting a first electric arc and at least first and second laser beams into a first groove on a first side of the component and simultaneously projecting a second electric arc and at least third and fourth laser beams into a second groove on a second side of the component. The first and second electric arcs melt and deposit a filler material in the first and second grooves, respectively, while the first and second laser beams are projected onto opposite first and second walls, respectively, of the first groove and the third and fourth laser beams are projected onto opposite third and fourth walls, respectively, of the second groove. The axis of each of the first, second, third and fourth laser beams is oriented at an angle of sixty degrees or less relative to the respective wall) thereof.

According to a third aspect of the invention, an apparatus is provided that includes an arc welding apparatus adapted to generate an electric arc for melting and depositing a filler material onto a surface and at least one laser beam generator adapted to generate at least first and second laser beams and project the first and second laser beams onto opposite first and second walls, respectively, of the groove. The at least one laser beam generator is adapted to project the first and second laser beams so that each axis thereof is oriented at an angle of sixty degrees or less relative to the respective wall thereof.

A technical effect of the invention is the ability to fill a groove in an article to yield a weldment with improved wall fusion.

Other aspects and advantages of this invention will be better appreciated from the following detailed description.

DETAILED DESCRIPTION OF THE INVENTION

Figure 1:
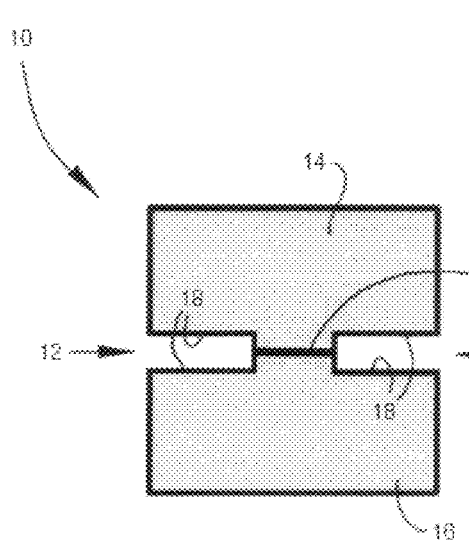
FIGS. 1, 2 and 3 are plan views that schematically represent profiles of narrow groove joint geometries that can be welded with a welding technique and apparatus in accordance with certain embodiments of the present invention.
Figure 2:
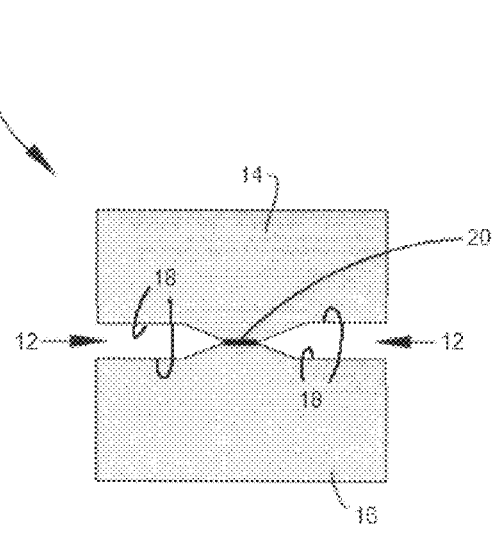
Figure 3:
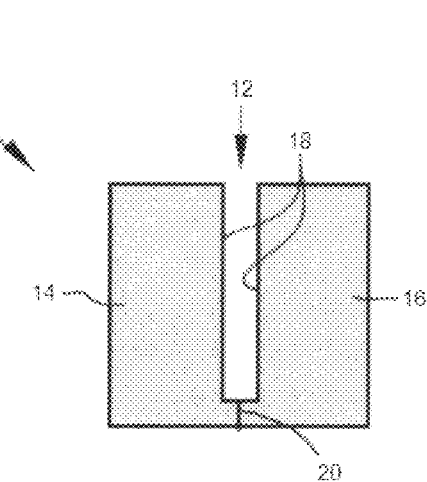

FIGS. 1, 2 and 3 represent various nonlimiting configurations of components 10 in which a narrow groove 12 is present and is to be filled using a narrow groove welding technique, for example, to join portions 14 and 16 of the component 10 together to yield a unitary article. The portions 14 and 16 may be products of a step in the original manufacturing or repair of the components 10. Furthermore, the portions 14 and 16 can be formed of the same or different materials. While the invention is not limited to the welding of any particular material, highly alloyed metal alloys are of particular interest, for example, nonlimiting examples of which include CrMoV-base steels of types used for components of steam turbine engines.

Each groove 12 is represented in FIGS. 1 through 3 as defining flat opposing surfaces or walls 18. The walls 18 may or may not be parallel to each other, allowing for a wide variety of joint geometries, including but not limited to those represented in FIGS. 1 through 3. Each groove 12 also defines a root face 20, at which the portions 14 and 16 of the component 10 contact each other. The walls 18 of the grooves 12 and the surfaces of the portions 14 and 16 that define the root faces 20 can be produced to have the configurations of the types shown in FIGS. 1, 2 and 3 through the use of conventional machining techniques. In any event, for the purpose of carrying out a narrow groove welding technique, each groove 12 is relatively narrow, for example, having a maximum width of less than 20 mm and preferably in a range of about 10 to about 18 mm, which minimizes the joint volume (the volume defined between the walls 18) that must be filled by welding to join the portions 14 and 16 of each component 10. The maximum depth of the groove 12 is only limited by the capabilities of the welding device. In practice, the methods hereinafter described have successfully welded grooves 12 with a depth of up to about four inches.

Figure 4:
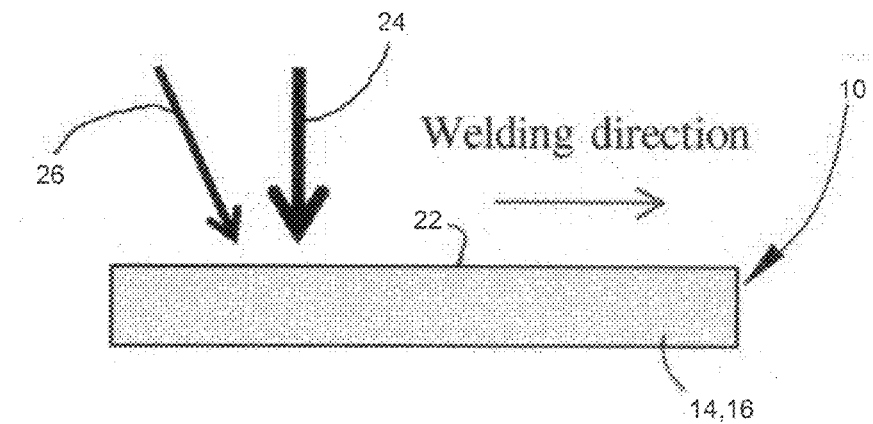
FIG. 4 represents a side view that schematically shows an operational arrangement for a hybrid laser arc welding technique of the prior art.

In carrying out a narrow groove welding technique, the two portions 14 and 16 of each component 10 are preferably initially joined by welding the root face 20 using any suitable welding process. Suitable distances between the surfaces at the root face 12 prior to welding will depend on the penetration capabilities of the welding process used. Once this initial welding step, referred to as a root pass, has been successfully completed to join the two portions 14 and 16 of the component 10 together, filler passes are performed to fill the remaining narrow groove 12 of the component 10 with a suitable filler material. In one embodiment of the present invention, filler passes are preformed using a hybrid laser arc welding (HLAW) process, also known as laser-hybrid welding. HLAW is a process that combines laser beam and arc welding techniques, such that both welding processes simultaneously occur in the same weld pool. As schematically represented in FIG. 4, a HLAW process may entail projecting a laser beam 24 perpendicularly onto surfaces 22 of the portions 14 and 16 to be welded, while an electric arc 26 of an arc welding process (for example, gas metal arc welding (GMAW, also known as metal inert gas (MIG) welding) or gas tungsten arc welding (GTAW, also known as tungsten inert gas (TIG) welding) is typically positioned behind (aft) and angled forward toward the focal point of the laser beam 24 on the component 10. A filler metal is deposited with the electric arc 26, by which the groove (not shown in FIG. 4) can be filled.

Because HLAW techniques can be high energy density processes that result in lower overall heat input as compared to other welding processes, the use of a HLAW process has the capability of improving the quality of a resulting weldment by lowering thermal stresses in the component 10.

The filler metal can be provided in the form of electrodes that are consumed in a GMAW process, or a wire that is fed into the arc 26. In either case, the filler metal is melted and forms metallic drops that deposit onto the surfaces of the walls 18 within the groove 12. Various compositions can be used as the filler metal, with preferred materials depending on the compositions of the portions 14 and 16 of the component 10 and the intended application. For example, a ductile filler may be preferred to reduce the tendency for cracking in the resulting weldment, or a filler may be chosen whose chemistry more closely matches the base metal (or metals) of the component portions 14 and 16 to more nearly maintain the desired properties of the component 10.

A common issue when performing a narrow groove welding process is the incomplete fusion of the filler metal into the walls 18 of the groove 12. This issue may be exacerbated if the component 10 being welded is formed of a highly alloyed metal, nonlimiting examples of which include CrMoV-base steel components of steam turbine engines However, the methods herein described may be used on any other materials, such as, but not limited to, carbon steel, stainless steel, superalloys, low-alloy steel, and others.

Figure 5:
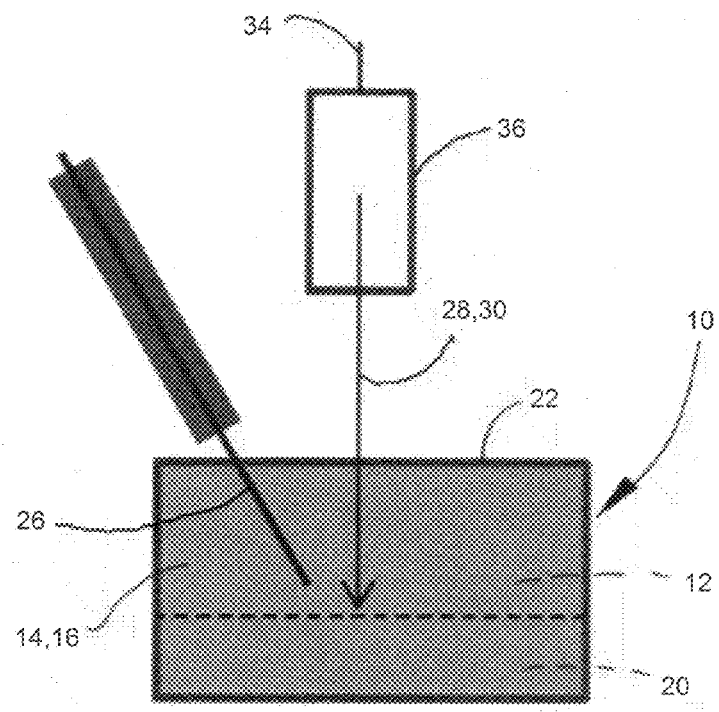
FIG. 5 schematically represents a side view of a component and schematically shows a hybrid welding operation being performed within a groove of the component in accordance with an embodiment of the present invention.
Figure 6:
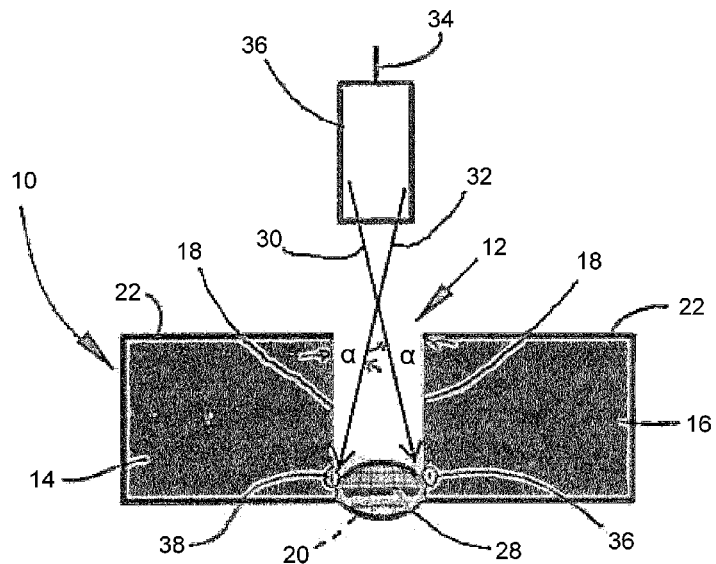
FIGS. 6 and 7 schematically represent end and plan views, respectively, of the welding operation of FIG. 5.
Figure 7:
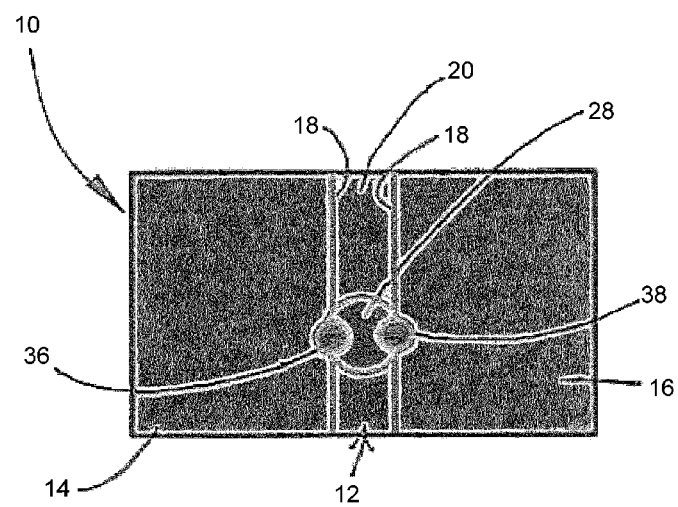

According to a preferred aspect of the present invention, an HLAW welding system of the type represented in FIG. 4 can be modified to utilize multiple laser beams 30 and 32, as schematically represented in FIGS. 5, 6 and 7, instead of the single laser beam 24 represented in FIG. 4. The component 10 represented in FIGS. 5, 6 and 7 is preferably similar in geometry to the joint represented in FIG. 3. The electric arc 26 and the filler material applied by the arc 26 can be the same as that described in reference to FIG. 4. In the particular embodiment shown in FIGS. 5 through 7, two laser beams 30 and 32 are shown, though the use of additional laser beams is also within the scope of the invention. The laser beams 30 and 32 may be generated by separate laser beam generators or, as represented in FIGS. 5 and 6, generated by splitting a single laser beam 34 with the use of a suitable laser beam splitter 36, for example, a prism. As evident from FIG. 6, each laser beams 30 and 32 is directed at an acute angle, a, relative to one of the walls 18 of the groove 12, and defines projections 36 and 38 on the surfaces of the walls 18 adjacent a root face 20 previously formed at the base of the groove 12. As also seen in FIG. 6, the electric arc 26 is projected at an acute angle relative to each of the laser beams 30 and 32. The angle between the electric arc 26 and the optical axis of each laser beam 30 and 32 will typically be up to about sixty degrees, for example, about ten to about sixty degrees, and more preferably about twenty to about thirty degrees. Good results have been obtained with an angle of about twenty-six degrees between the electric arc 26 and the optical axis of each laser beam 30 and 32. However, the angle used will depend on the geometry of the particular component 10 being welded. Any angle may be used that is suitable for allowing all of the heating elements work together to provide a common molten metal which is operable to solidify and join surfaces 14 and 16 with a common filler metal. Furthermore, the laser beams 30 and 32 need not necessarily be projected at the same angle as long as each laser beam 30 and 32 impinges its respective wall 18. Likewise, projections 36 and 38 may be offset from one another along the welding direction by up to about ten millimeters.

The orientation and power of the laser beams 30 and 32 are intentionally adapted to enable the laser beams 30 and 32 to interact with the groove walls 18 in a manner that ensures fusion between the groove walls 18 and the filler metal deposited with the electric arc 26 during the welding process. The laser beams 30 and 32 are not required to deeply penetrate the groove walls 18, and therefore may be at lower power levels than are typical used in prior art HLAW welding processes. As nonlimiting examples, the power levels of the laser beams 30 and 32 may be about 2 kW to about 4 kW, preferably about 2.5 kW to about 3.5 kW. Furthermore, the power levels of the laser beams 30 and 32 can be the very same, and in most cases are preferably within about 50 percent of each other. The projection angle ($\alpha$) at which the optical axis of each laser beam 30 and 32 is oriented relative to the surface of the wall 18 onto which the beam 30 or 32 is projected will typically be greater than zero degrees but less than 60 degrees, for example, about 10 to about 50 degrees, and more preferably about 15 to about 45 degrees. Good results have been obtained with projection angles of about 20 degrees. While the beams 30 and 32 and essentially perpendicular to the surfaces 22 of the component portions 14 and 16 as viewed from the side (perpendicular to the direction that the welding operation progresses through the groove 12), it is foreseeable that the beams 30 and 32 could be inclined individually or together toward or opposite the direction that the welding operation progresses through the groove 12

The arc welding apparatus that generates the electric arc 26 for the process represented in FIG. 6 is preferably a GMAW welder, although other types of arc welders may be used. Particular parameters relating to the operation and use of the arc welder and its electric arc 26, such as fill materials, deposit rates of the fill material, arc welder power levels, etc., will generally be understood by those skilled in the art and therefore will not be discussed in any detail here.

In addition to improving fusion between the filler metal and the groove walls 18, the laser beams 30 and 32 may further be directed in a manner that helps to stabilize the projection 28 of the electric arc 26, represented in FIGS. 6 and 7 as being projected onto the root face 20. The molten pool generated by the electric arc 26 may not be stable in the molten pool, specifically at its projection 28 edges due to its free arc characteristics, which may cause a lack of fusion in narrow groove welding. For this reason, it may be desirable for each of the laser beams 30 and 32 to be spaced from the center of the arc projection 28 by a distance of less than about 10 mm along the welding direction. The laser beams 30 and 32 impinge on the molten pool generated by electric arc 26 which may cause the molten pool to become stable due to a relatively constant temperature gradient being established around the energy-concentrated laser beams 30 and 32. Directing the laser beams 30 and 32 in this manner eliminates the need for a high power laser commonly used in HLAW devices thereby reducing the overall cost of the welding process. Stabilization of the electric arc projection 28 can be particularly advantageous during high speed welding runs, and may allow for welding speeds of 60 inches per minute (about 150 centimeters per minute) or more, as compared to about 20 inches per minute (about 50 centimeters per minute) or less typical for traditional arc welding process.

The above described joint filling processes may be automated with a seam tracking technique, and may be repeated as necessary until the narrow groove 12 of the component 10 is adequately filled. While the welding operation is represented in FIGS. 5 through 7 as being performed on one side of a component 10, it is also within the scope of the invention to simultaneously perform welding operations on opposite sides of a component, for example, to weld the grooves 12 of the components 10 represented in FIGS. 1 and 2. Such a welding technique can greatly decrease the welding time and further improve the resulting weldment by lowering distortion and residual stresses due to the creation of a symmetric weldment. For this purpose, the welding operations performed on opposite sides of the component can be directly opposite each other, though they may be offset from one another in the direction of the weld path by a distance of up to 50 mm.

While the invention has been described in terms of particular embodiments, it is apparent that other forms could be adopted by one skilled in the art. For example, the physical configuration of the HLAW welding system could differ from that described, and materials and processes other than those noted could be used. Therefore, the scope of the invention is to be limited only by the following claims.

The invention claimed is:

1. A method of welding a component to fill a groove therein, the method comprising simultaneously projecting an electric arc and at least first and second laser beams into the groove, the electric arc melting and depositing a filler material in the groove, the first and second laser beams being projected onto opposite first and second walls, respectively, of the groove, an axis of each of the first and second laser beams being oriented at an acute angle relative to the respective wall thereof.

2. The method according to claim 1, wherein the projecting step further comprises orienting the axis of each of the first and second laser beams at the acute angle of about 5 to about 60 degrees relative to the respective wall thereof.

3. The method according to claim 1, wherein the projecting step further comprises orienting the axis of each of the first and second laser beams at an angle of about 10 to about 60 degrees relative to an axis of the electric arc.

4. The method according to claim 1, wherein the projecting step further comprises spacing each of the first and second laser beams from a center of the arc projection by a distance of less than 20 mm along the welding direction.

5. The method according to claim 1, the method further comprising creating the first and second laser beams by splitting a primary laser beam.

6. The method according to claim 1, wherein the projecting step further comprises projecting the first and second laser beams are at a power level of about 2 kW to about 4 kW.

7. The method according to claim 1, the method further comprising forming the component as a component of a steam turbine engine.

8. A method of welding a component to fill grooves therein, the method comprising:
   simultaneously projecting a first electric arc and at least first and second laser beams into a first groove on a first side of the component, the first and second laser beams being projected onto opposite first and second walls, respectively, of the first groove, an axis of each of the first and second laser beams being oriented at an acute angle relative to the respective wall thereof; and
   simultaneously projecting a second electric arc and at least third and fourth laser beams into a second groove on a second side of the component, the first and second electric arcs melting and depositing a filler material in the first and second grooves respectively, the third and fourth laser beams being projected onto opposite third and fourth walls, respectively, of the second groove, the axis of each of the third and fourth laser beams being oriented at an acute angle relative to the respective wall thereof.

9. The method according to claim 8, wherein the projecting steps further comprise orienting the axis of each of the first, second, third and fourth laser beams at the acute angle of about 5 to about 60 degrees relative to the respective wall thereof.

10. The method according to claim 8, wherein the projecting steps further comprise orienting the axis of each of the first and second laser beams at an angle of about 10 to about 60 degrees relative to an axis of the first electric arc and orienting the axis of each of the third and fourth laser beams at an angle of about 10 to about 60 degrees relative to an axis of the second electric arc.

11. The method according to claim 8, wherein the projecting steps further comprise spacing each of the first and second laser beams from a center of an arc projection of the first electric arc by a distance of less than 20 mm and spacing each of the third and fourth second laser beams from a center of an arc projection of the second electric arc by a distance of less than 20 mm.

12. The method according to claim 8, the method further comprising creating the first and second laser beams by splitting a first primary laser beam and creating the third and fourth laser beams by splitting a second primary laser beam.

13. The method according to claim 8, wherein the projecting steps further comprise projecting each of the first, second, third and fourth laser beams at power levels of about 2 kW to about 4 kW.

14. The method according to claim 8, wherein the projecting steps further comprise projecting the first and second electric arcs on opposite sides of the component and offset from one another along a weld path by a distance of up to 50 mm.

15. The method according to claim 8, the method further comprising forming the component as a component of a steam turbine engine.

16. An apparatus configured to weld a component to fill a groove therein, the apparatus comprising:

an arc welding apparatus adapted to generate an electric arc for melting and depositing a filler material into a groove; and at least one laser beam generator adapted to generate at least first and second laser beams and project the first and second laser beams onto opposite first and second walls, respectively, of the groove, the at least one laser beam generator being adapted to project the first and second laser beams so that each axis thereof is oriented at an acute angle relative to the respective wall thereof and at an acute angle relative to an axis of the electric arc.

17. The apparatus according to claim 16, wherein the axis of each of the first and second laser beams is oriented to be projected onto first and second walls of the groove at the acute angle of about 5 to about 60 relative to the respective wall thereof.

18. The apparatus according to claim 16, wherein the axis of each of the first and second laser beams is oriented to be projected onto first and second walls of the groove at the acute angle of about 10 to about 60 degrees relative to the axis of the electric arc.

19. The method according to claim 16, wherein the apparatus is adapted to create first and second laser beams by splitting a first primary laser beam.

20. The method according to claim 16, wherein the laser beam generator is adapted to generate the first and second laser beams are at a power level of about 2 kW to about 4 kW.

* * * * *